United States Patent [19]
Hitomi et al.

[11] Patent Number: 5,509,394
[45] Date of Patent: Apr. 23, 1996

[54] INTERNAL COMBUSTION ENGINE WITH SUPERCHARGER

[75] Inventors: Mitsuo Hitomi; Kenji Kashiyama; Shunji Masuda, all of Hiroshima, Japan

[73] Assignee: Mazda Motor Corporation, Hiroshima, Japan

[21] Appl. No.: 189,838

[22] Filed: Feb. 1, 1994

[30] Foreign Application Priority Data

Feb. 3, 1993 [JP] Japan ................................ 5-016476
Feb. 3, 1993 [JP] Japan ................................ 5-016477

[51] Int. Cl.$^6$ ................................................ F02B 33/00
[52] U.S. Cl. .................. 123/559.1; 123/570; 123/571; 123/90.15
[58] Field of Search ........................ 123/559.1, 570, 123/571, 90.15; 60/605.2

[56] References Cited

U.S. PATENT DOCUMENTS

| | | | |
|---|---|---|---|
| 4,702,219 | 10/1987 | Tadokoro et al. | 123/559.1 |
| 5,203,311 | 4/1993 | Hitomi et al. | 123/570 |
| 5,230,320 | 7/1993 | Hitomi et al. | 123/559.1 |
| 5,357,936 | 10/1994 | Hitomi et al. | 123/571 |

FOREIGN PATENT DOCUMENTS

| | | | |
|---|---|---|---|
| 60-237153 | 11/1985 | Japan . | |
| 2-119620 | 5/1990 | Japan . | |
| 3-23327 | 1/1991 | Japan . | |
| 4-136467 | 5/1992 | Japan | 60/605.2 |

Primary Examiner—Richard A. Bertsch
Assistant Examiner—Charles G. Freay
Attorney, Agent, or Firm—Fish & Richardson

[57] ABSTRACT

An internal combustion engine with a supercharger, of a reciprocating piston type, having a supercharger disposed in an intake passage, wherein the relation of a pressure ratio ($\gamma = P/P_o$) of pressure (P) on the discharge side of the supercharger to atmospheric pressure ($P_o$) at the time of high load with a geometric compression ratio ($\epsilon$) of the engine and a cylinder bore size (B), represented by millimeter, satisfies the following formula:

$$\gamma \geq -0.29\epsilon + 6.0 - 0.022B.$$

46 Claims, 11 Drawing Sheets

INTERNAL COMBUSTION ENGINE WITH SUPERCHARGER

BACKGROUND OF THE INVENTION

1. Field of the Invention

The present invention relates to an internal combustion engine with a supercharger and, more particularly, to a supercharged internal combustion engine having two or more intake valves disposed for one cylinder and a supercharger disposed in an intake passage.

2. Description of the Related Art

There are known internal combustion engines having a supercharger disposed in an intake passage with the attempt to improve filling efficiency and increase torque of the engine. The provision of the internal combustion engine with the supercharger in order to increase filling efficiency, however, suffers from the disadvantages that knocking is likely to occur in a low-rotation and high-load region and temperature of exhaust gases is likely to rise in a high-rotation and high-load region. This may adversely affect improvements in filling efficiency.

As technology of preventing supercharged engines from causing knocking, for example, Japanese Patent Unexamined Publication (Kokai) No. 2-119,620 discloses supercharged engines in which the timing of closing an intake valve is retarded or an overlap period of time during which the period of time in which the intake valve is opened overlaps with the period of time in which an exhaust valve is opened is prolonged. When the timing of closing the intake valve is retarded to a great extent after the bottom dead center (BDC), the effective compression ratio becomes reduced and an elevation of temperature is suppressed due to compression work, thereby improving anti-knocking performance. On the other hand, when the overlap period of time is prolonged, the anti-knocking ability can be improved by enhancing the scavenging ability and thereby reducing residual exhaust gases.

Further, for example, Japanese Patent Unexamined Publication (Kokai) No. 3-23,327 proposes supercharged engines so arranged as to make an air-fuel ratio lean in a supercharging region, in order to suppress temperature of exhaust gases from elevating.

In addition to the technology as disclosed in those references as described hereinabove, the knocking can be suppressed by making a cylinder bore size small shortening a distance in which flame expands or propagates or by retarding a timing of ignition. Further, it is desired to provide each cylinder with two or more intake valves, enlarging an opening area of the intake valve in order to increase an output of the engine.

It can be noted herein that various factors including a cylinder bore size, a timing of ignition, a compression ratio of the engine, a pressure ratio of a supercharger, and the like are associated with each other in order to prevent knocking and increase an output of the engine; however, for supercharged engines of conventional type, the relations of those factors with the anti-knocking performance and an increase of the engine output is not considered to a sufficient extent and there are still room for improvement in anti-knocking performance and the increase of the engine output.

Further, as the technique of suppressing the temperature of exhaust gases from elevating, it is known that the air-fuel ratio is made lean, the air-fuel ratio is made richer than required for output, and a compression ratio is made high. However, such a lean air-fuel ratio is disadvantageous in terms of output of the engine; such a richer air-fuel ratio is disadvantageous in terms of fuel economy, and such a high compression ratio is disadvantageous in terms of the anti-knocking performance.

In addition, Japanese Patent Unexamined Publication No. 60-237,153 discloses a supercharged engine in which exhaust gases are recirculated (EGR) in the supercharging region; however, this device for recirculating exhaust gases is arranged to recirculate the exhaust gases (EGR) with the attempt to reduce NOx. No attention is paid to anti-knocking ability and suppression of an elevation of exhaust gases.

SUMMARY OF THE INVENTION

Therefore, the primary object of the present invention is to provide an internal combustion engine with a supercharger, which is so adapted as to provide an optimal combination of conditions including a pressure ratio of the supercharger, a cylinder bore size of the engine, and a geometric compression ratio, in order to increase torque of the engine while ensuring the anti-knocking ability.

The present invention has another object to provide a supercharged internal combustion engine so adapted as to effectively suppress the temperature of exhaust gases from elevating in a high-speed and high-load region, while improving the anti-knocking ability and increasing the torque by means of improvements in filling efficiency of the engine.

In order to achieve the primary object of the present invention, a supercharged internal combustion engine of a reciprocating piston type, having a supercharger disposed in an intake passage, wherein the relation of a pressure ratio ($\gamma=P/Po$) of pressure (P) on the discharge side of the supercharger to atmospheric pressure (Po) at the time of high load with a geometric compression ratio ($\epsilon$) of the engine and a cylinder bore size (B), represented by millimeter, satisfies the following formula:

$$\gamma \geq 0.29\epsilon + 6.0 - 0.022B.$$

Further, the primary object of the present invention can be achieved by a supercharged internal combustion engine of a reciprocating piston type, having a supercharger disposed in an intake passage, wherein the relation of a pressure ratio ($\gamma= P/Po$) of pressure (P) on the discharge side of the supercharger to atmospheric pressure (Po) at the time of high load with a geometric compression ratio ($\epsilon$) of the engine, a cylinder bore size (B), represented by millimeter, and an octane value (Ro) of fuel satisfies the following formula:

$$\gamma = 6b\ 631\ 0.29\epsilon + 0.09 + 0.059Ro - 0.022B.$$

In order to achieve the second object, in particular to reduce temperature of exhaust gases, the present invention consists of a supercharged internal combustion engine of a reciprocating piston type, having a supercharger disposed in an intake passage and comprising an EGR means for recirculating exhaust gases into a combustion chamber in a cylinder of the engine at least at the time of high load, wherein a cylinder bore size is 70 mm or less; and wherein the relation of a geometric compression ratio ($\epsilon$) of the engine with an EGR rate (Re), represented by %, of recirculation of the exhaust gases by the EGR means satisfies the following formula:

$$Re \geq (9-\epsilon) \times 3.$$

In addition, the second object of the present invention can be achieved by a supercharged internal combustion engine of a reciprocating piston type, having a supercharger disposed in an intake passage and comprising an EGR means for recirculating exhaust gases into a combustion chamber in a cylinder of the engine at least at the time of high load, wherein a speed of engine rotation, Na, which gives a piston speed Um=2.0×10,000 mm per second, is set to be equal to or larger than a speed of engine rotation, Nb, which gives a mean intake mach number Mi=0.5; and wherein the relation of a geometric compression ratio ($\epsilon$) of the engine with an EGR rate (Re), represented by %, of recirculation of the exhaust gases by the EGR means satisfies the following formula:

$$Re \geq (9-\epsilon) \times 8.$$

In order to achieve the second object of the present invention, a supercharged internal combustion engine of a reciprocating piston type, having a supercharger disposed in an intake passage and comprising an EGR means for recirculating exhaust gases into a combustion chamber in a cylinder of the engine at least at the time of high load, wherein a displacement of one cylinder, that is, a single chamber volume, is set to be 400 cc or less; wherein a ratio of a piston stroke S to the cylinder bore size B (S/B) is set to be larger than 1; and wherein the relation of a geometric compression ratio ($\epsilon$) of the engine with an EGR rate (Re), represented by %, of recirculation of the exhaust gases by the EGR means satisfies the following formula:

$$Re \geq (9-\epsilon) \times 3.$$

Other objects, features and advantages of this invention will become apparent in the course of the description of the preferred embodiments, with reference to the accompanying drawings.

DESCRIPTION OF THE PREFERRED EMBODIMENTS

The present invention will be described more in detail with reference to the accompanying drawings.

Figure 1:
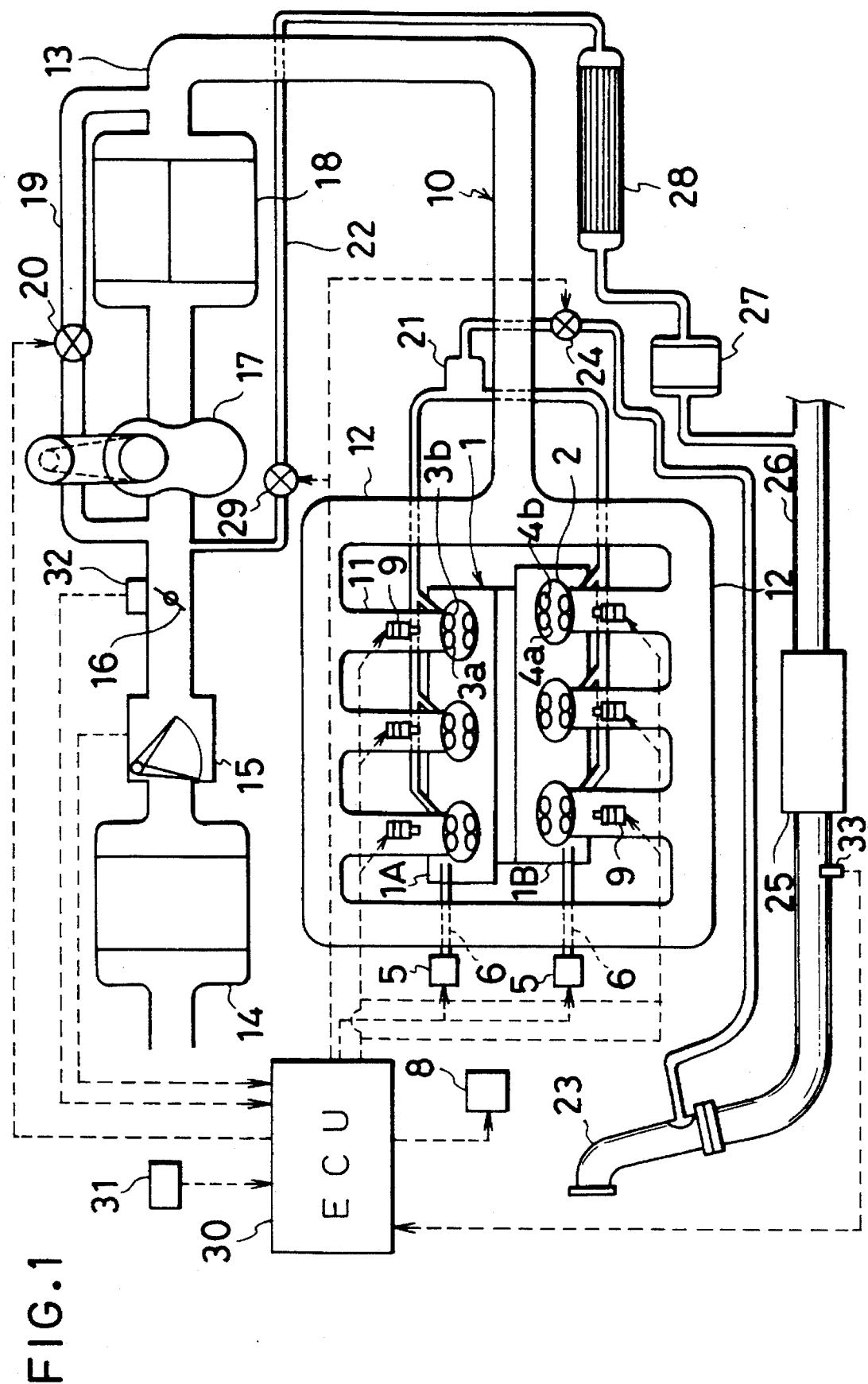
FIG. 1 is a schematic view showing an outline of a supercharged engine according to an embodiment of the present invention.

FIG. 1 shows the overall structure of the supercharged engine according to an embodiment of the present invention.

In FIG. 1, a V-shaped engine is shown, in which an engine body 1 has a pair of cylinder banks 1A and 1B arranged in a V-shaped relationship. Each of the cylinder banks 1A and 1B is provided with a plurality of cylinders 2, for example, three cylinders. In other words, the internal combustion engine to be employed for the embodiment of the present invention may be a so-called V-type 6-cylinder engine.

Figure 2:
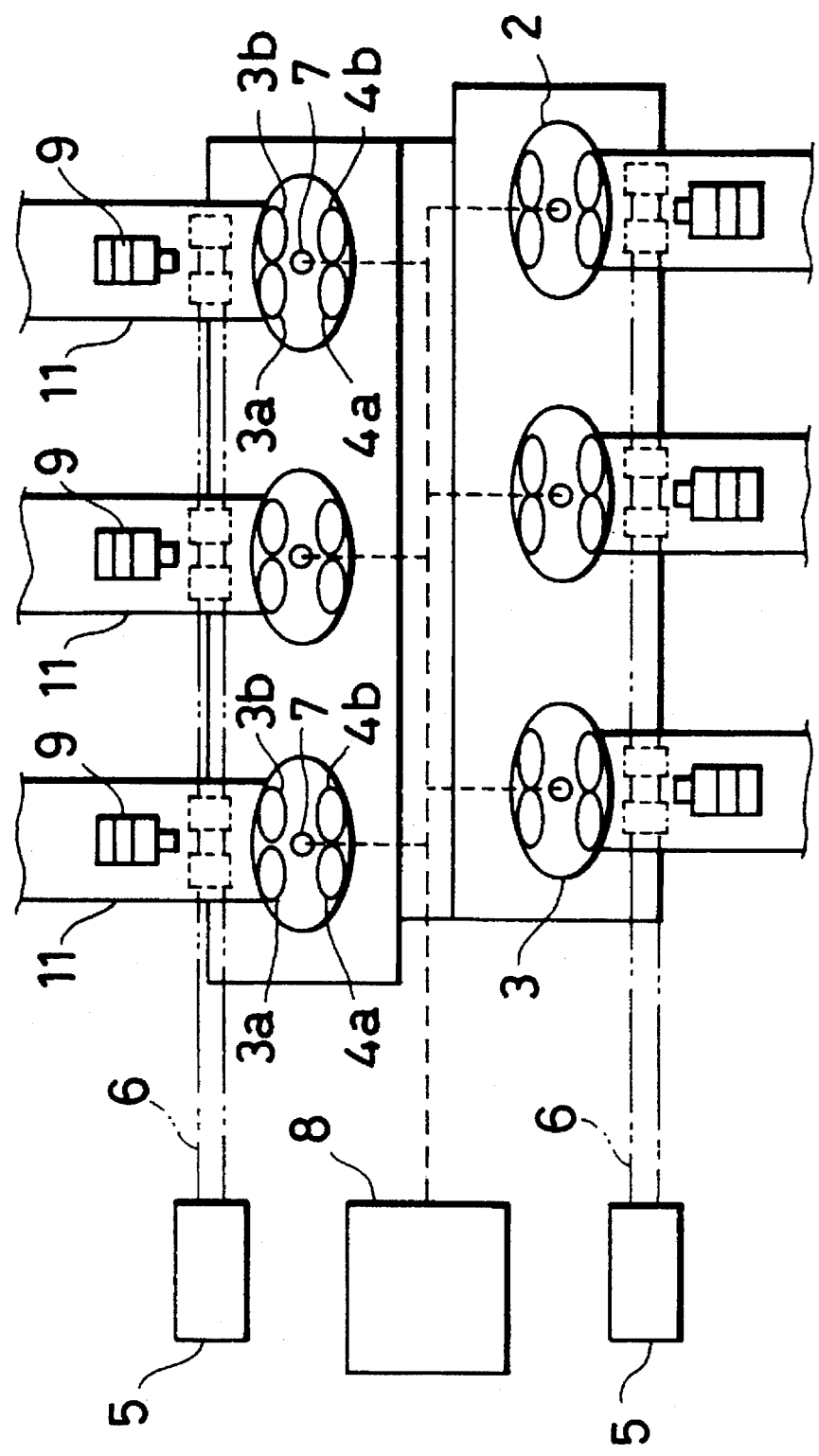
FIG. 2 is a schematic view showing a main body of the engine and a portion in the vicinity of the engine.

Each of the cylinders 2 is provided with first and second intake ports 3a and 3b and first and second exhaust ports 4a and 4b, each being communicated with a combustion chamber. An intake valve (not shown) is mounted to each of the intake ports 3a and 3b and an exhaust valve (not shown) is mounted to each of the exhaust ports 4a and 4b. To a valve driving mechanism for driving the intake valves is mounted a valve timing change-over mechanism 5 for altering a timing of opening and closing the intake valve, for example, by changing the phase of a cam shaft 6 with respect to a cam pulley. Further, each of the cylinders 2 is provided with a spark plug 7, as shown in FIG. 2, which in turn is connected to a spark circuit 8 containing a spark coil and a distributer.

As shown in FIG. 1, a discrete intake passage 11 downstream of an intake passage 10 is connected to each of the intake ports 3a and 3b, and an injector for injecting fuel is disposed in the vicinity of the intake port for each discrete intake passage 11.

The intake passage 10 comprises an intake manifold 12, having the discrete intake passage 11, and a common intake passage 13 upstream of the intake manifold. The common intake passage 13 is provided with an air cleaner 14, an air flowmeter 15 and a throttle valve 16. To the common intake passage is further mounted a supercharger 17. The supercharger as shown in the drawings is of a mechanically drivable supercharger so arranged as to be driven with an output shaft of the engine through a power transmitting means such as a belt. Particularly, it is desired to employ a supercharger of an internal compression type, such as a supercharger of Lysholm type (a screw type), in order to gain a large pressure ratio. Further, the supercharger 17 is disposed in the position downstream of the throttle valve 16, in order to reduce a loss in driving at the time of low load. To the common intake passage 13 downstream of the supercharger 17 are mounted an intercooler 18 and a bypass control valve 20 for opening and closing a bypass path 19 disposed so as to bypass the supercharger 17.

In addition, the engine body 1 is provided with an EGR passage for recirculating exhaust gases into an exhaust system of the engine. In the embodiment as shown in the drawings, the EGR passage comprises a low-load EGR passage 21 and a high-load EGR passage 22. The low-load EGR passage 21 is connected at its one end to an exhaust manifold 23 and it branches at its other end and is connected to the discrete intake passage 11. A low-load EGR valve 24 is mounted at an intermediate point of the low-load EGR passage 21. On the other hand, the high-load EGR passage 22 is connected at its one end to an exhaust passage 26 downstream of a catalyst converter 25 and at its other end to the common intake passage 13 upstream of the supercharger 17. The high-load EGR passage 22 is provided with a carbon trap 27, an EGR cooler 28 and a high-load EGR valve 29.

When the exhaust gases are recirculated through the high-load EGR passage 22, that is, when the EGR is carried out through the high-load EGR passage 22, the EGR gases are led from a relatively downstream side of the exhaust passage through a relatively long passage into the combustion chamber, and the exhaust gases are caused to cool to a sufficient extent by means of the EGR cooler 28.

As shown in FIG. 1, reference numeral 30 denotes a control unit (ECU) for controlling the internal combustion engine. The control unit is so arranged as to control the amount of fuel to be injected into the combustion chamber from the injector 9, in accordance with an amount of intake air or other factors, in response to signals from the air flowmeter 15, an engine rotation sensor 31, a sensor 32 for sensing the opening angle of the throttle valve, and the like. Further, the control unit is arranged to control the timing of ignition in accordance with the running status of the engine and to control the valve timing change-over mechanism 5, the bypass control valve 20 and the EGR valves 24 and 29. It is to be noted herein that the amount of fuel to be injected is subjected to feedback control in accordance with the output of an oxygen ($O_2$) sensor 33, so as for the air-fuel ratio to become stoichiometric, in a wide region containing the supercharging region. Further, the air-fuel ratio may be controlled to range from A/F=12–13, as an air-fuel ratio to such an extent as necessary for increasing the output in a high load region in the vicinity of the entire load.

Figure 3:
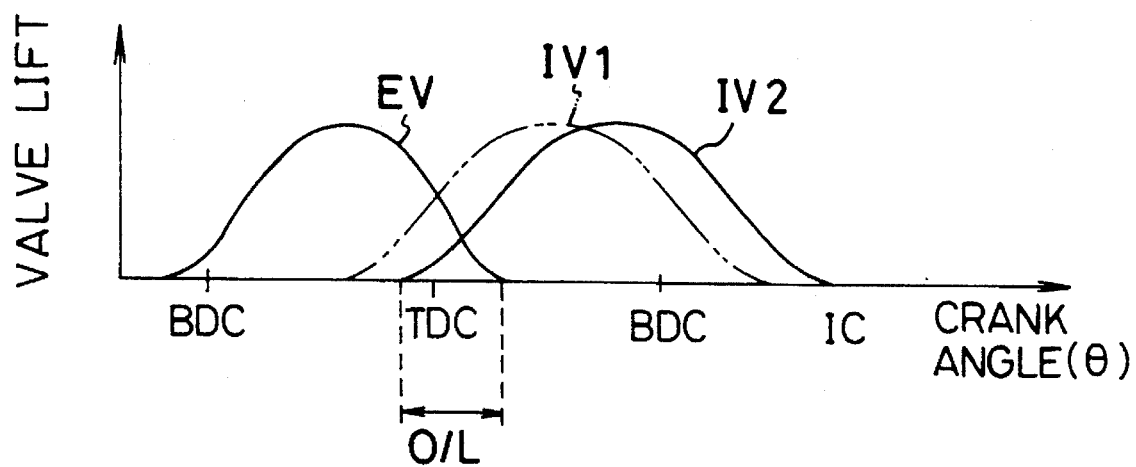
FIG. 3 is a graph showing a valve timing.

As shown in FIG. 3, the valve timing change-over mechanism 5 is so arranged as to change its valve timing between a first valve timing IV1 and a second valve timing IV2, the first valve timing being the timing at which the timing for opening and closing the intake valve is set to be on a relatively spark advance side and the second valve timing being the timing at which the timing therefor is set to be on a side relatively retarded from the first valve timing IV1. Hence, the valve timing change-over mechanism 5 can change an overlap amount (O/L) in which the period of time during which the intake valve is opened overlaps with the period of time during which the exhaust valve (EV) is opened and, further, it can alter the timing (IC) for closing the intake valve. By controlling the timing for opening and closing the intake valve in accordance with the running status by the control unit 30, for example, the low load side is set at the first timing IV1 and the high load side is set at the second timing IV2.

The bypass control valve 20 is controlled so as to be opened at the low load side and closed at the high load side. In the control of the EGR, both of the EGR valves 24 and 29 are controlled to be closed in an idle region. On the other hand, only the low-load EGR valve 24 is controlled to be opened in the low load region excluding the idle region and only the high-load EGR valve 29 is controlled to be opened in the high load region.

In accordance with the present invention, the supercharged engine has its cylinder bore size B set to 70 mm or less, preferably to 50 mm≦B≦70 mm.

The relations of the pressure ratio (γ) of the pressure (P) at the discharge side of the supercharger at the time of high load with respect to atmospheric pressure (Po), i.e. γ= P/Po, with the geometric compression ratio (ε) of the engine and the cylinder bore size (B), represented by millimeter, is set so as to satisfy the following formula (1):

$$\gamma \geq -0.29\epsilon + 6.0 - 0.022B.$$

In the settings that satisfy the formula (1), the timing of ignition is controlled so as to be retarded by an extent that can prevent knocking, in accordance with the filling efficiency $\eta c$ and the geometric compression ratio $\epsilon$ of the engine, which depend upon the pressure ratio $\gamma$.

The system according to the embodiment of this invention can improve the filling efficiency and raise the torque of the engine to its almost maximal level by making the cylinder bore size B smaller so as to become advantageous to the suppression of knocking and by adjusting the timing of ignition to cause no knocking, in the range in which the requirements for ensuring reliability and for preventing a rapid increase of intake resistance can be satisfied.

These actions will be described more in detail with reference to data as shown in FIGS. 4–12.

Grounds for Setting Cylinder Bore Size and Its Action

In order to improve an anti-knocking ability in an internal combustion engine with a supercharger, it is desired that the cylinder bore size be made as small as possible so as to become advantageous to the suppression of knocking. It is further desired to make the cylinder bore size smaller in order to reduce a load imposed upon the bearing of a crank shaft. On the other hand, however, when a desired amount of displacement is sought to be ensured by making the cylinder bore size smaller yet enlarging a piston stroke, it is necessary to take into account the limitation of reliability due to an excessive speed of the piston and the limitation due to a rapid increase of intake air resistance causing a compression of the intake valve.

First, considerations will be made of the limitation of reliability, which may be caused due to the fact that the speed of the piston becomes faster.

A mean piston speed Um (mm per second) can be represented by the formula (2) as follows:

$$Um=(N/30) \times S$$

where N is the speed of rotation of the engine, represented in rpm; and

S is the stroke of the piston, as represented in millimeter.

It is said that a limit value of the mean speed of the piston, Um, is usually 20 m/s (Um=$2.0 \times 10^4$ mm per second). Thus, the formula (2) above can give a piston stroke in accordance with the speed of rotation of the engine, by replacing the formula (2) with this limit value. Further, a single chamber volume corresponding to the cylinder bore size B can be given on the basis of the piston stroke. The one-dot-one-dash line in FIG. 5 indicates the single chamber volume which gives Um=$2.0 \times 10^4$ mm per second, when represented by every 1,000 rpm in the range of the speed of engine rotation of from 4,000 rpm to 8,000 rpm so as to correspond to the cylinder bore size.

Then, considerations will be made of the limitation caused by a rapid increase of intake air resistance.

It is generally known that resistance to intake air increases rapidly when a mean intake mach number, Mi, becomes Mi=0.5, thereby decreasing volume efficiency rapidly.

The mean intake mach number, Mi, can be represented by the formula (3) as follows:

$$Mi = \frac{Vh \times (\eta_v/100)}{a \times Fim \frac{(\theta_{IC} - \theta_{IO})}{6N}}$$

where Vh is the volume of the single chamber as represented in cc;

$\eta_v$ is the efficiency in volume as represented in %;

a is the sonic speed as represented in cm per second;

$\theta_{IC}$ is the timing for closing the intake valve;

$\theta_{IO}$ is the timing for opening the intake valve;

N is the speed of rotation of the engine as represented in rpm;

Fim is the mean opening area of the intake valve as represented in cm².

The mean opening area of the intake valve, Fim, can be represented by the formula as follows:

$$Fim = Fia/(\phi_{IC} - \phi_{IO})$$

where Fia is the effective angular area of the intake valve.

Then, the effective angular area of the intake valve, Fia, can be represented by the formula as follows:

$$Fia = \int_{\theta_{IO}}^{\theta_{IC}} \mu_i(\theta) \times Fi(\theta) d\theta$$

where Fi is the opening area of the intake valve;

Fi($\phi$) is the opening area of the intake valve when the crank angle is indicated by $\phi$; and $\mu_i$ is the flow rate coefficient.

It should be noted herein that the flow rate coefficient $\mu_i$ is a ratio of the area through which air actually flows to the area of the current minimal air passage, when it is assumed that the air flow is the same and the pressure is the same and that the flow rate coefficient becomes smaller as a valve lift is larger. The flow rate $\mu_i(\phi)$ is the one at the crank angle $\phi$. Further, the value of the formula:

$$\int_{\theta_{IO}}^{\theta_{IC}} \mu_i(\theta) \times Fi(\theta) d\theta$$

is approximately 0.9 in general cases.

Other conditions may be defined in a manner as will be described hereinafter.

(1) When it is set that each cylinder has two intake valves and two exhaust valves and that the areas of the intake valves are the same and the areas of the exhaust valves are the same, an area ratio of the intake valves to the exhaust valves at a throat section is 1.5.

(2) The volume efficiency is 100%.

(3) The combustion chamber is of a penthouse type.

(4) The distance between the valve seats for the intake valves is 2.5 mm or over.

(5) The distance between the valve seat of the intake valve and the valve seat of the exhaust valve is 3.5 mm or over.

(6) The distance between the valve seats for the exhaust valves is 4.0 mm or over.

(7) The distance between the valve seat of the intake valve and a spark plug is 2.5 mm or over.

(8) The distance between the valve seat of the exhaust valve and the spark plug is 3.5 mm or over.

(9) The angle between the valves is 30°.

(10) The diameter of the plug is 14 mm.

(11) The diameter of a stem is 6 mm.

(12) The diameter of the throat section is computed by subtracting 5 mm from the diameter of the valve seat.

(13) The length of a valve lift is 8.5 mm.

(14) The timing for opening the valve is 256 deg CA.

Figure 4:
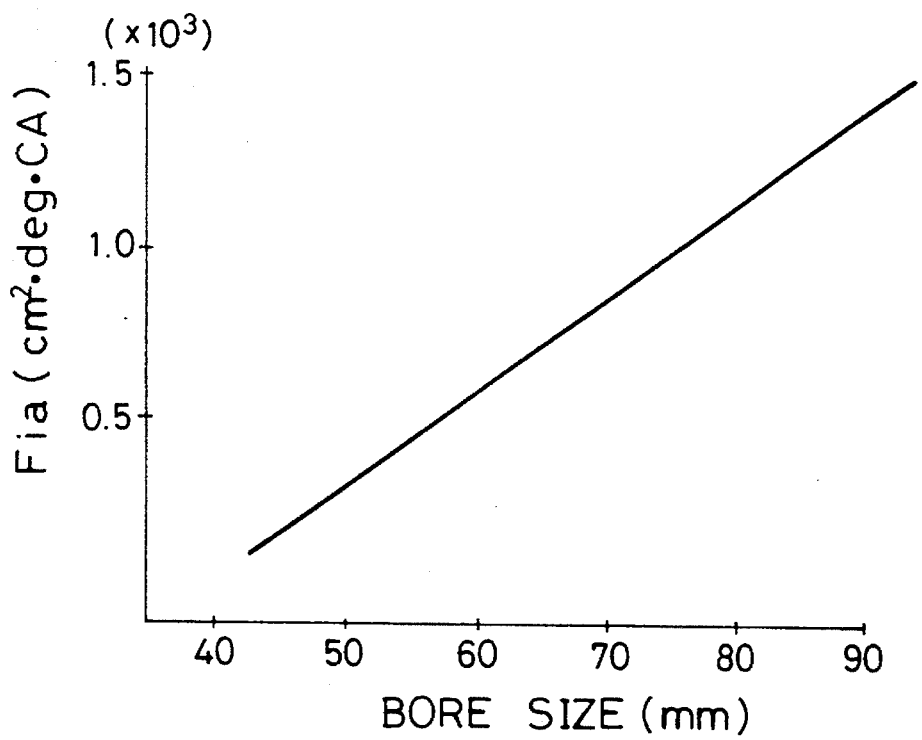
FIG. 4 is a graph showing the relations of the cylinder bore size with the effective angular area of the intake valve.

When the conditions are set in the manner as described hereinabove, the relations of the effective angular area of the intake valve, Fia, with the cylinder bore size are as shown in FIG. 4. Further, the mean mach number Mi depends upon the single chamber volume, the cylinder bore size and the speed of engine rotation. The solid line in FIG. 5 indicates the single chamber volume with respect to the cylinder bore size, which gives the mean mach number Mi=0.5, at every 1,000 rpm of the speed of engine in the range of from 4,000 rpm to 8,000 rpm.

When the first speed of engine rotation that gives the mean piston speed Um=2.0×10⁴ mm per second is indicated by reference symbol Na, the second speed of engine rotation that gives the mean mach number Mi=0.5 is indicated by reference symbol Nb, and the first speed of engine rotation Na is larger than the second speed of engine rotation Nb (Na>Nb), the cylinder bore size is set to be so large as for air to enter to a sufficient extent up to the high speed side beyond the limitation of reliability. Hence, this setting of the cylinder bore size is against the requirement for making the cylinder bore size small. On the other hand, when Na−Nb>2,000 rpm, the speed of rotation generating the maximal horse power (speed of rotation near Nb) becomes too low, as compared to the limitation of reliability, and this setting is not preferred in terms of engine performance. From the point of view of engine performance, it is desired to set the speed of rotation generating the maximal horse power to 5,000 rpm or higher. On the other hand, from the point of view of reliability limitation, it is preferred to set it to 8,000 rpm or less.

Figure 5:
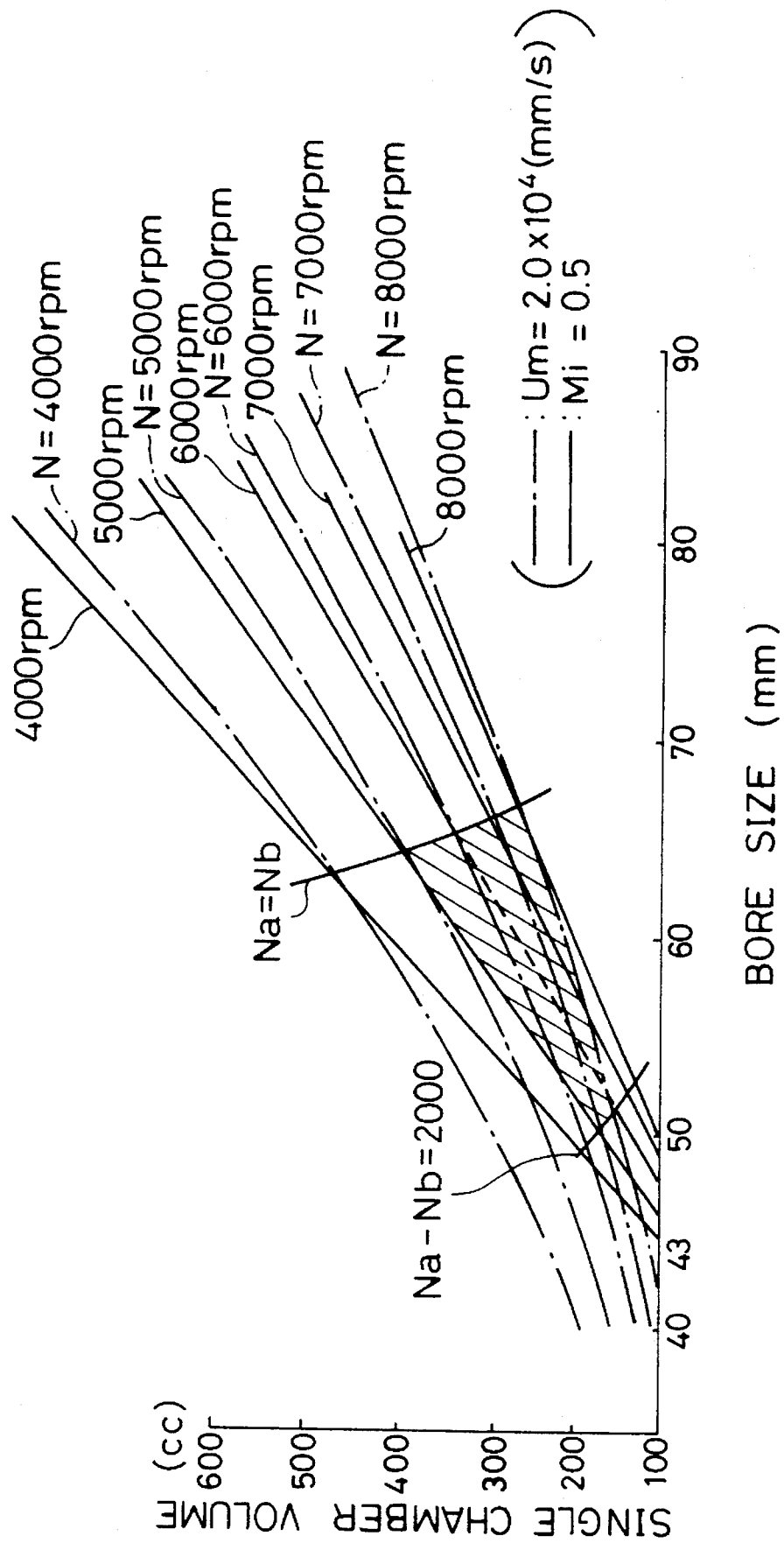
FIG. 5 is a graph showing the relations of the cylinder bore size with the single chamber volume.

From the foregoing description, the regions indicated by Na≧Nb, Na-Nb≦2,000 rpm, Nb≧5,000 rpm, and Na≦8,000 rpm, that is, the regions hatched in FIG. 5, can satisfy both of the requirement for making the cylinder bore size smaller and the requirement for achieving engine performance. In other words, it is preferred to set the cylinder bore size B to 50 mm≧B≧ 70 mm, preferably 51 mm≦B≦67 mm; the single chamber volume to from 150 cc to 400 cc; and the ratio of the piston stroke S to the cylinder bore size B to S/B>1.

Grounds for Settings Satisfying Formula (1) and Action

Figure 6:
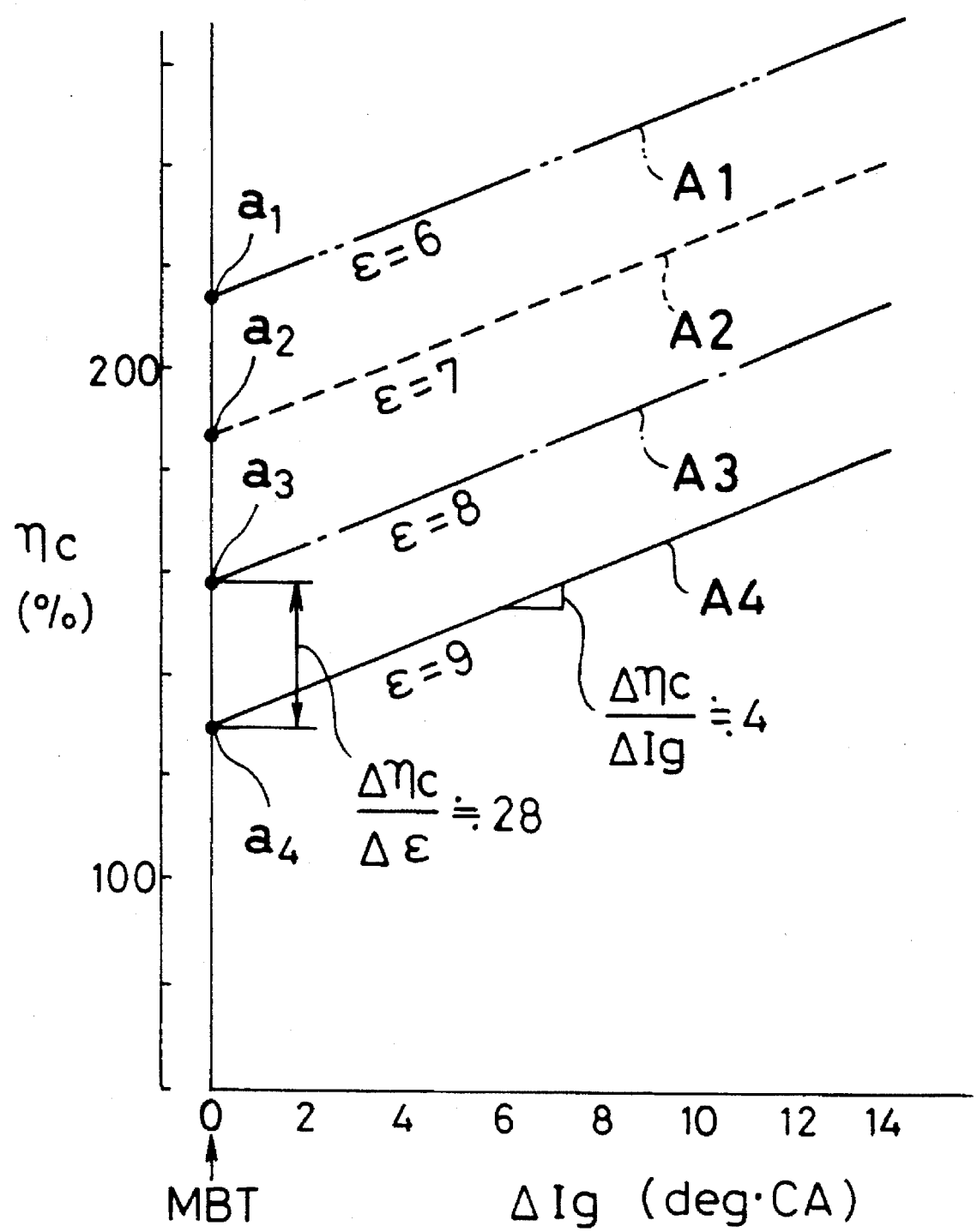
FIG. 6 is a graph showing the relations of the period of time retarded from MBT, filling efficiency and compression rate.

FIG. 6 shows the relations of the filling efficiency, $\eta c$, with respect to the degree of the timing of ignition, $\Delta Ig$, retarded from MBT (Minimum spark advance for Best Torque), with the geometric compression ratio, $\epsilon$, used as a parameter. In FIG. 6, lines A1, A2, A3 and A4 indicate the cases where the geometric compression ratio $\epsilon$ is set to 6, 7, 8 and 9, respectively. The retarded degree of the timing of ignition, $\Delta Ig$, is a value adjusted so as to cause no knocking in accordance with the filling efficiency, $\eta c$. The data shown in FIG. 6 is given when the cylinder bore size B is set to 63 mm. The MBT is the timing of ignition that makes the torque highest in the filling efficiency causing no knocking.

As is apparent from the data as shown in FIG. 6, knocking is more likely to occur as the geometric compression ratio $\epsilon$ of the engine becomes higher or as the filling efficiency, $\eta c$, becomes higher. Hence, in order to cause no knocking at the MBT, it is necessary to reduce the filling efficiency $\eta c$ to a lower value as the metric compression ratio ε becomes higher, for example, to reduce the filling efficiency ηc by 28% as the geometric compression ratio ε is made higher by ε=1.0. On the other hand, when the geometric compression ratio ε is set constant, it is necessary to make the retarded degree of the timing of ignition ΔIg larger in proportion to the filling efficiency ηc as the filling efficiency ηc becomes higher, in order to suppress knocking. Further, when the filling efficiency ηc is set constant, it is necessary to make the retarded degree of the timing of ignition ΔIg larger in proportion to the geometric compression ratio ε as the geometric compression ratio ε becomes higher, in order to suppress knocking. Accordingly, the relations among the geometric compression ratio ε, the filling efficiency ηc, and the retarded degree of the timing of ignition ΔIg indicate the characteristics as shown in FIG. 6.

Figure 7:
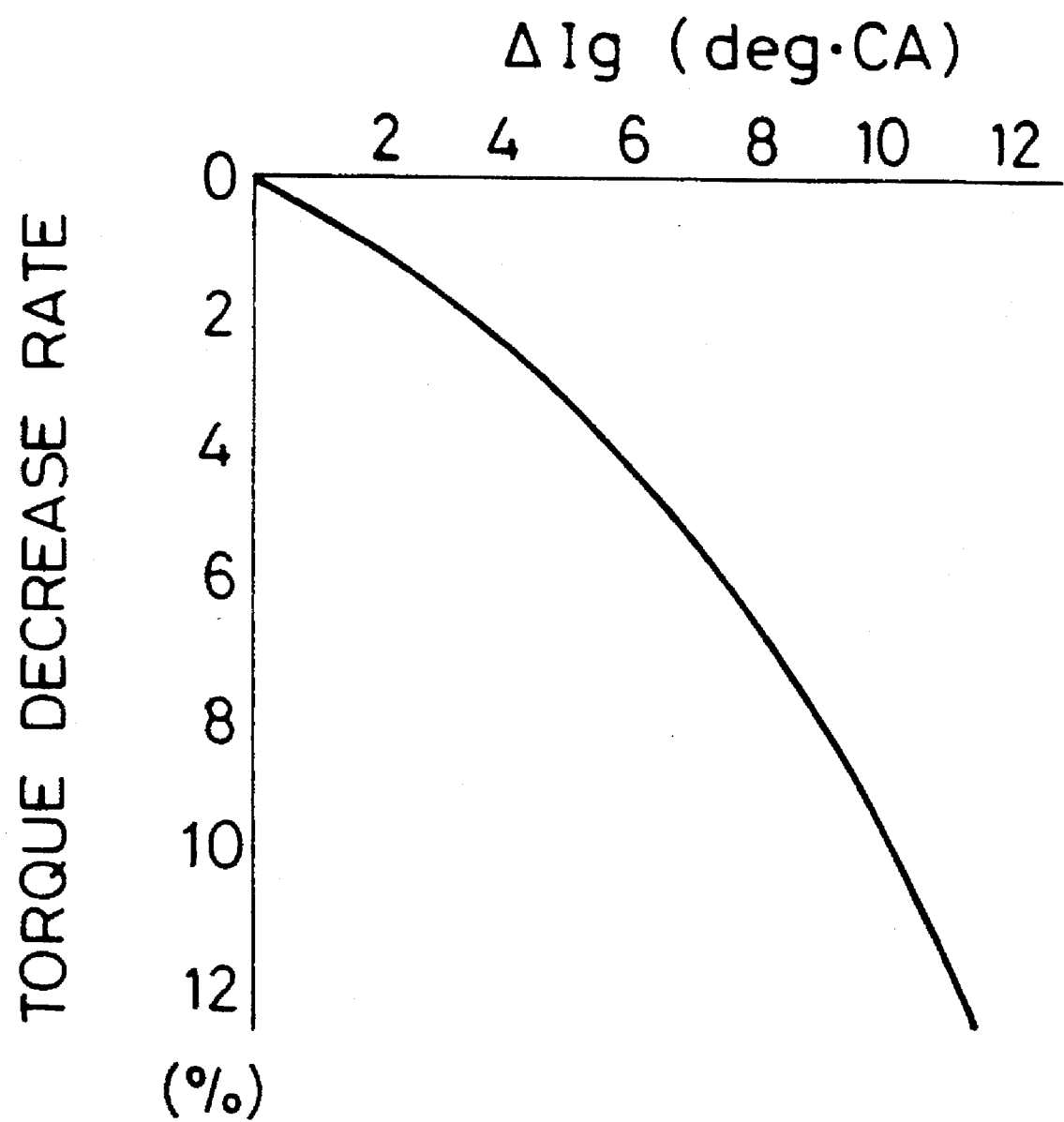
FIG. 7 is a graph showing the relations of the period of time retarded from MBT with a rate of torque reduced.

FIG. 7 shows the relations of a rate of a decrease in torque with respect to the degree of the timing of ignition, ΔIg, retarded from the MBT. The rate of the torque decrease increases as the degree of the timing of ignition becomes larger in the manner as indicated by this graph.

Figure 8:
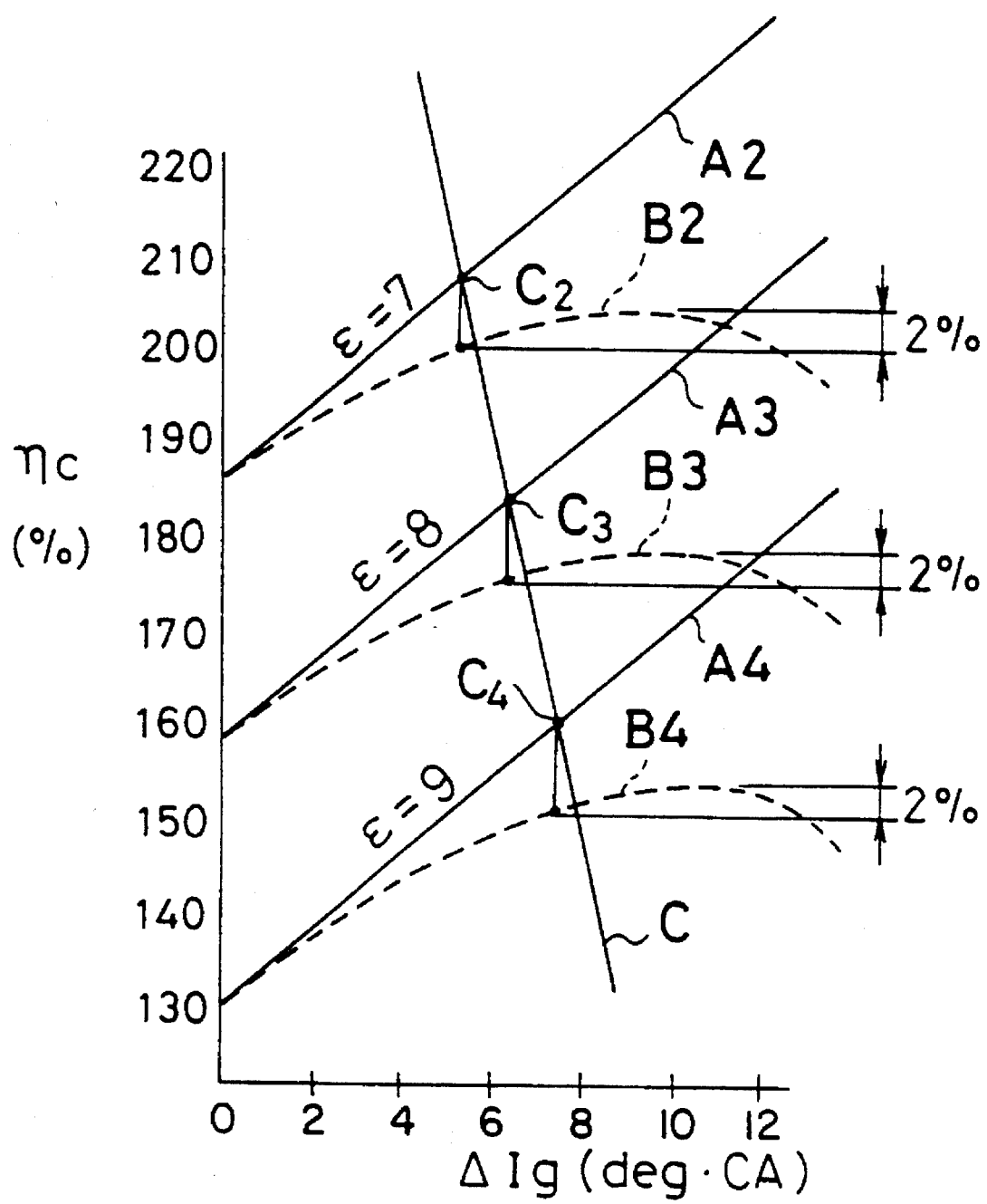
FIG. 8 is a graph showing the relations of the period of time retarded from MBT, filling efficiency, compression rate and torque.

FIG. 8 shows the relations of the filling efficiency ηc and the geometric compression ratio ε with respect to the degree of the timing of ignition, ΔIg, retarded from the MBT. In FIG. 8, the solid lines A2, A3 and A4 indicate the cases when the geometric compression ratio ε is set to 7, 8 and 9, respectively, as well as the broken lines B2, B3 and B4 indicate the portions of substantial improvements in the filling efficiency ηc, with the decrease in torque taken into account, which are gained by retarding the timing of ignition. The substantial improvements in the filling efficiency ηc correspond to the raised torque of the engine and they are translated into the portions of such improvements in the filling efficiency, when it is assumed that an elevation of torque gained by making the filling efficiency while retarding the timing of ignition at each compression rate as indicated in FIG. 8 could be achieved by increasing the amount to be filled while holding the timing of ignition at the MBT.

As shown in FIG. 8, when the filling efficiency ηc is raised while retarding the timing of ignition, the amount computed by subtracting the amount of the torque decreased by retarding the timing of ignition from the amount of the torque increased by elevating the filling efficiency ηc (as indicated by the solid lines A2, A3 and A4) corresponds to the amount of the torque actually changed (as indicated by the broken lines B2, B3 and B4). Further, it can be noted that, when the retarded degree of the timing of ignition becomes larger to some extent, the torque becomes largest and, even if the retarded degree of the timing of ignition would be increased larger than that maximal limit, the torque becomes rather decreased yet the filling efficiency ηc can be increased. Hence, in order to increase the torque by increasing the filling efficiency ηc while preventing knocking that is more likely to occur as the filling efficiency ηc becomes higher, by retarding the timing of ignition, it is preferred to gain the torque near the maximal value that can achieve the characteristics as indicated by the broken lines B2, B3 and B4. In this sense, it is preferred to select the torque so as to achieve the filling efficiency ηc in the range of or within 2% from the maximal value. In FIG. 8, each of the points C2, C3 and C4 indicates the point at which the filling efficiency ηc is raised by 2% below the level that can gain the maximal torque while retarding the timing of ignition. The solid line C is the line connecting such points C2, C3 and C4.

Figure 9:
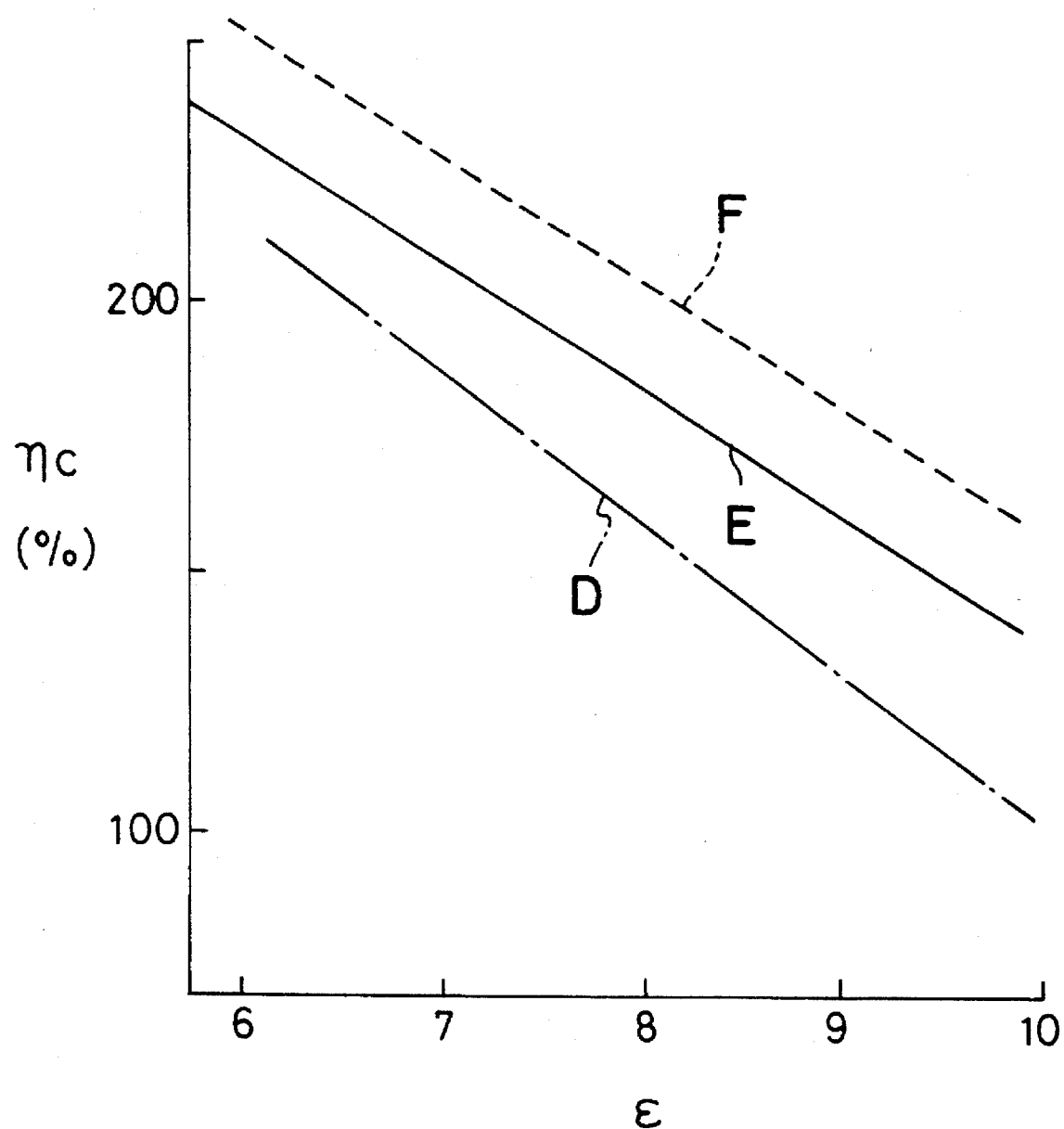
FIG. 9 is a graph showing the relations of the compression rate with filling efficiency.

In FIG. 9, the line E indicates the relations of the filling efficiency ηc with the compression ratio ε when the filling efficiency ηc is raised by 2% below the level that can gain the maximal torque while retarding the timing of ignition, on the basis of the data as shown in FIG. 8. In other words, the line E represents the characteristics of the line C in FIG. 8 by using the compression ratio ε as a parameter for the x-axis. On the other hand, the line D in FIG. 9 indicates the relations of the filling efficiency ηc with the compression ratio ε when the filling efficiency ηc is adjusted so as for the knocking limit of the timing of ignition to agree with the MBT (corresponding to points a1, a2, a3 and a4 in FIG. 6).

As is apparent from the comparison of the line D with the line E, it is found that the torque can be increased by raising the filling efficiency ηc while retarding the timing of ignition. The characteristics of the line E can be represented by the following numerical formula (4):

$$\eta c = -24 \times \epsilon + 375$$

This data is expressed when the cylinder bore size B is set to 63 mm.

It can be noted herein, however, that the filling efficiency ηc that can achieve a constant anti-knocking performance is higher as the cylinder bore size B becomes smaller. Although experimentally confirmed by the present inventors, filling efficiency ηc can be raised by 7% by making the cylinder bore size B smaller by 4 mm. When this result is taken into account, the formula (4) can be converted into the following formula (5):

$$\eta c = -24 \times \epsilon + 375 - 7/4(B-63).$$

On the other hand, the filling efficiency ηc has the relations with the pressure ratio γ (=P/Po, i.e. a ratio of the pressure at the discharge side of the supercharger (P) to the atmospheric pressure (Po)) of the supercharger as represented by the following formula (6), in which the ambient temperature is set to To=300° K., the temperature of the supercharged air is set to Tb= 333° K. (60° C.) (adjusted to be almost constant by the intercooler), and the volume efficiency ηv to 0.9×100%:

$$\eta_c = \eta v \times (To/Tb) \times \gamma = 90 \times (300/333) \times \gamma$$
$$\approx 81\gamma$$

Figure 10:
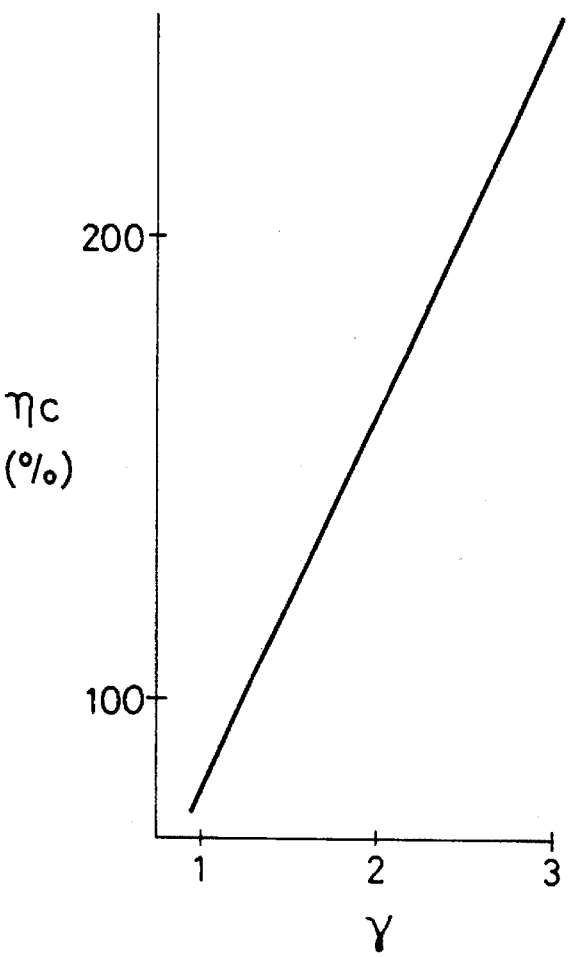
FIG. 10 is a graph showing the relations of supercharging pressure ratio with filling efficiency.

The formula may be represented as shown in FIG. 10.

On the other hand, the formula (5) can be converted into the formula (7) by replacing the formula (5) with the formula (6) as follows:

$$\gamma = -0.296 \times \epsilon + 6.0 - 0.022B.$$

Figure 11:
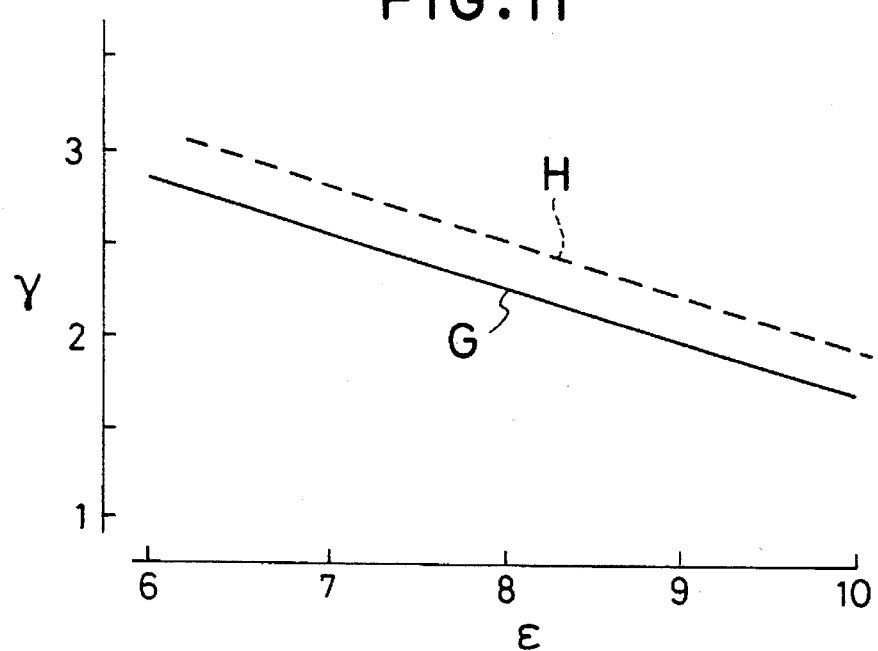
FIG. 11 is a graph showing the relations of supercharging pressure ratio with compression rate.

When the cylinder bore size B is set to B=63 mm, this formula may be represented by the solid line G in FIG. 11. It can be noted herein that the approximately maximal torque can be obtained above the line given by the formula (7).

Hence, the relations as indicated by the formula (1) can be given approximately. By setting conditions so as to satisfy the relations, the torque can be raised to the nearly maximal level while ensuring anti-knocking performance by retarding the timing of ignition.

Action to Suppress Knocking by Retarding Closing Intake Valve and Scavenging The anti-knocking ability can be improved by decreasing the effective compression ratio and suppressing temperature of exhaust gases from elevating due to compression work, when the timing of closing the intake valve, IC, is set so as to be retarded at a crank angle of 60° or more after BDC, in the characteristics for the operations of the valves as shown in FIG. 3. Further, the anti-knocking ability can be raised by improving the scavenging ability and decreasing the residual amount of exhaust gases, when the overlap period of time, O/L, during which both of the intake valve and the exhaust valve are opened, is set at a crank angle of 20° or more. The crank angle, such as 20° and 60°, is intended to mean the crank angle indicative of the timing of opening or closing the valve at the time when the valve is lifted by 1 mm.

It can be noted herein that, at least in the low-rotation and high-load region, when the anti-knocking ability is raised by retarding the timing of closing the intake valve or by enlarging the overlap period of time in the manner as described hereinabove and when the filling efficiency $\eta c$ is raised up to the level at which the torque can be gained by 2% below the maximal level, by retarding the timing of ignition, the relations of the filling efficiency $\eta c$ with the compression ratio $\epsilon$ in the cylinder bore size B of 63 mm may be indicated by the line F in FIG. 9. As is apparent from the characteristics as shown in FIG. 9, the filling efficiency $\eta c$ in the case of the line F can be said to be by approximately 20% higher than that in the case of the line E. When the cylinder bore size B is added to the relations, the formula (5) may be converted into the formula (8) as follows:

$$\eta c = -24 \times \epsilon + 395 - 7/4(B-63).$$

In this formula, the value 395 is the value obtained by adding 20 (an increase in the filling efficiency $\eta c$) to 375 in the formula (5).

When the filling efficiency is translated into the pressure ratio $\gamma$ on the basis of the formula (6), the following formula (9) is given:

$$\gamma = -0.296 \times \epsilon + 6.2 - 0.022B.$$

This formula may be indicated by the line H in FIG. 11, when the cylinder bore size B is set to 63 mm.

When the action of retarding the closing of the intake valve or scavenging is added, the torque can be elevated to the nearly maximal level while ensuring the anti-knocking performance by setting the conditions so as to approximately satisfy the relations as indicated by the formula (10) as follows:

$$\gamma \geq -0.29 \times \epsilon + 6.2 - 0.022B.$$

Relations with EGR and Octane Value of Fuel

In the internal combustion engine as shown in FIG. 1, the anti-knocking ability can be raised by supplying the combustion chamber with EGR gases cooled to a sufficient extent in the high-load EGR passage 22 at the high load time. Further, the anti-knocking ability can be raised to a higher value as the octane value of fuel becomes higher.

When an EGR rate is represented by Re (%) when the cooled EGR gases are supplied to the combustion chamber and the octane value of fuel is represented by Ro, the formula (1) can be converted into the formula (11) as follows:

$$\gamma \times (1+Re/100) \geq -0.29 \times \epsilon + (a+b \times Ro) -0.022B + c \times Re/100,$$

where a, b and c are each a constant (a=0.09, b=0.059, and c=0.007, based on experiments by the present inventors).

By replacing the constants a, b and c with the corresponding numerals, the octane value Ro with ca. 100, and the EGR rate Re with zero (0), the formula (1) above can be given.

When the octane value Ro is replaced with Ro=100 in the formula (11), then the formula (12) can be given as follows:

$$\gamma \times (1+Re/100) \geq -0.29 \times \epsilon + 6.0 - 0.022B + 0.007Re/100.$$

When the EGR rate Re is replaced with Re=0 in the formula (11), then the formula (13) can be given as follows:

$$\gamma \geq -0.29 \times \epsilon + 0.09 + 0.059Ro - 0.022B.$$

Influence upon Temperature of Exhaust Gases

When the influence of the compression ratio $\epsilon$ upon the temperature of exhaust gases is taken into account in setting the conditions so as to satisfy the formula (1) or the formula (10) or (11), there is the tendency that the temperature is caused to become lower due to the fact that an expansion ratio becomes higher when the compression rate $\epsilon$ is made higher and, on the other hand, the temperature of the exhaust gases becomes higher as the compression ratio $\epsilon$ becomes lower.

It should be noted herein, however, that, since the timing of ignition is adjusted in accordance with the compression ratio $\epsilon$ and the filling efficiency $\eta c$, in order to ensure the anti-knocking performance, the elevation of the temperature of the exhaust gases can be avoided by advancing the timing of ignition when the compression ratio $\epsilon$ is lowered. This action will be described with reference to FIGS. 6 and 12.

Figure 12:
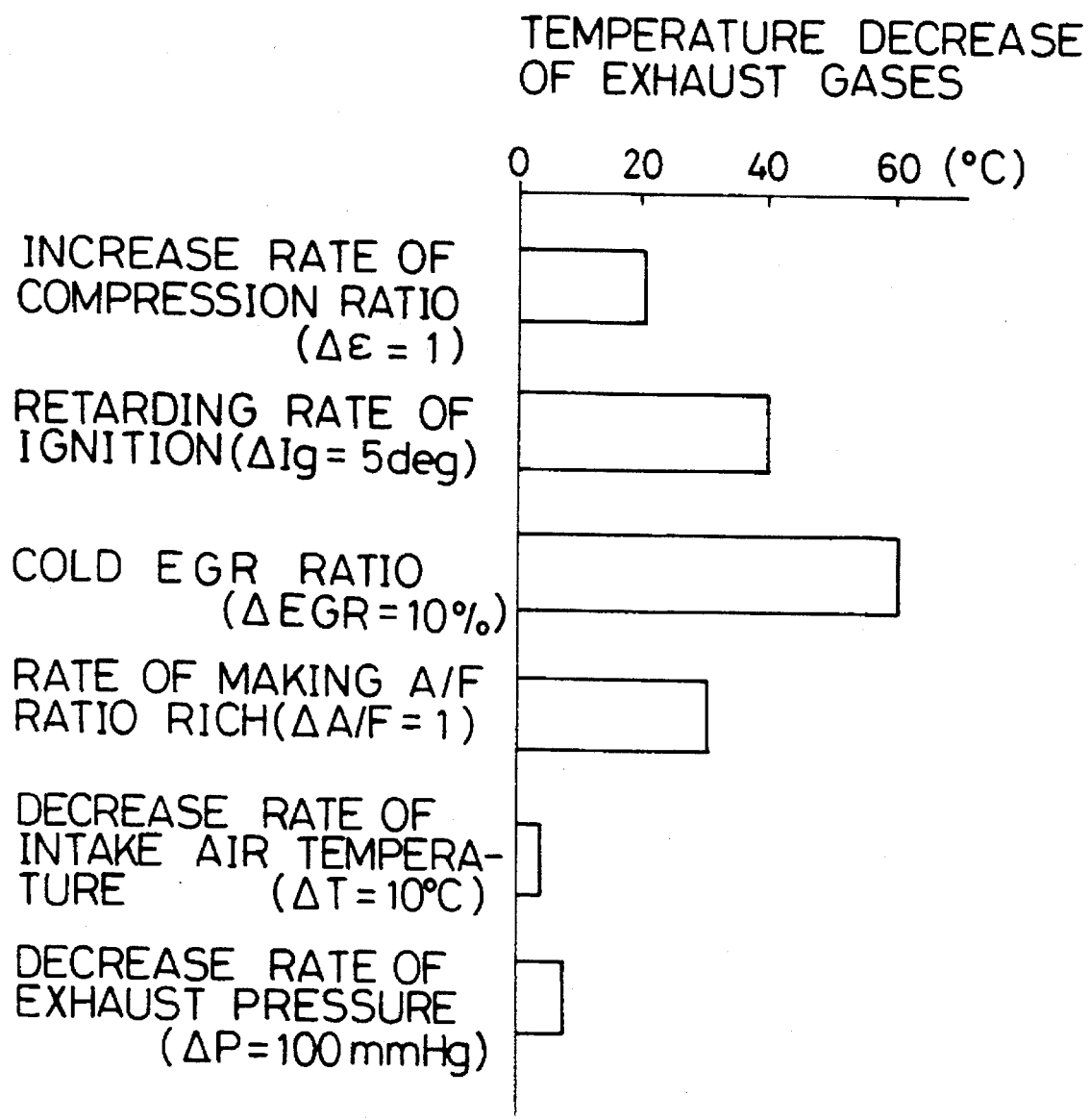
FIG. 12 is a graph showing the effects of various elements upon a decrease in temperature of exhaust gases.

FIG. 12 shows data investigated experimentally with respect to a decrease in the temperature of exhaust gases. This data reveals that the elevation of the compression rate $\epsilon$ and advancing the timing of ignition exert each an influence upon the temperature of exhaust gases. As comparative purposes, there are shown the influence of the supply of cooled EGR gases, rich air-fuel ratio, cooled intake air, and lowered exhaust pressure upon the temperature of exhaust gases. As is apparent from FIG. 12, it is found that the temperature of exhaust gases varies by 20° C. when the compression rate $\epsilon$ is changed by 1. On the other hand, the temperature of exhaust gases varies by 40° C. when the timing of ignition is changed by 5 deg. Hence, it is necessary to advance the timing of ignition by crank angle (ca.) 2.5 deg in order to compensate for the elevation of the temperature of exhaust gases caused by lowering the compression rate $\epsilon$ by 1.

Further, it should be noted that, in order to hold the anti-knocking ability at the same level as shown in FIG. 6, it is required to reduce the filling efficiency $\eta c$ by ca. 28% when the compression rate $\epsilon$ is raised by 1 or to reduce the filling efficiency $\eta c$ by ca. 4% when the timing of ignition is advanced by 1 deg. Hence, in order to hold the filling efficiency $\eta c$ and the anti-knocking ability at the same level when the compression rate $\epsilon$ is lowered by 1, it is necessary to advance the timing of ignition by ca. 7 deg. By advancing the timing of ignition by that degree, the temperature of the exhaust gases can be lowered to an extent greater than the elevation of the temperature of the exhaust gases caused by lowering the compression ratio $\epsilon$.

In summary, the elevation of the temperature of exhaust gases is not caused by adjusting the timing of ignition, even if the compression rate $\epsilon$ is low.

In accordance with the present invention, the supercharger 17 is not restricted to Lysholm type superchargers and other mechanically drivable superchargers or turbochargers may be employed, although such Lysholm type superchargers are suitable for supercharging sufficiently in order to ensure output, particularly when the closing of the intake valve is retarded.

As is understood from the data as shown in FIG. 5, for the supercharged internal combustion engine having two or more intake valves for every one cylinder, the anti-knocking ability can be raised by making the cylinder bore size smaller, i.e. 70 mm or smaller. Further, as is understood from the data as shown in FIGS. 6–11, the filling efficiency can be raised up to the level that provides the nearly maximal torque, while ensuring the anti-knocking ability, when the pressure ratio γ of the supercharger, the geometric compression ratio ε of the engine, and the cylinder bore size B are set so as to satisfy the relations as indicated by the formula:

$$\gamma \geq -0.29 \times \epsilon + 6.0 - 0.022B.$$

In addition, when the cylinder bore size B is set to 50 mm ≤B≤70 mm, the cylinder bore size can be made smaller while satisfying the requirements for engine performance.

Furthermore, when the timing of closing the intake valve is set to an crank angle of 60° or more after the BDC, or when the overlap period of time in which the period of time during which the intake valve is opened overlaps with the period of time during which the exhaust valve is opened is set to a crank angle of 20° or more and when the pressure ratio γ of the supercharger, the geometric compression ratio ε of the engine, and the cylinder bore size B are set so as to satisfy the relations as indicated by the formula: $\gamma \geq -0.29 \times \epsilon + 6.0 - 0.022B$, the anti-knocking ability can further be raised by retarding the timing of closing the intake valve or by making the overlap period of time longer. In this connection, the relations for elevating the torque of the engine to higher levels can be achieved.

Action of Suppressing Elevation of Temperature of Exhaust Gases

A description will now be made of the action of suppressing an elevation of the temperature of exhaust gases on the basis of the relations of the EGR rate Re with the geometric compression ratio ε, in addition to improvements in the anti-knocking ability by making the cylinder bore size smaller, while satisfying the requirements for reliability of the engine and for engine performance. This aspect of the embodiment of the supercharged engine according to the present invention corresponds to the second object of this invention and to FIGS. 1–5 and 12–23.

In this embodiment, the cylinder bore size B is set to from 50 mm to 70 mm, preferably from 51 mm to 67 mm, the single chamber volume of the cylinder is set to 150 cc to 400 cc, and the ratio of the piston stroke S to the cylinder bore size B is set to S/B>1. The meanings of these settings will be apparent from the foregoing description.

The EGR rate R(%) of EGR gases to be supplied from the high-load EGR passage 22 at the high-speed (high-rotation) and high-load time is set so as to satisfy the relations with the geometric compression ratio ε of the engine as indicated by the following formula (14):

$$R \geq (9-\epsilon) \times 3.$$

where the geometric compression ratio ε is set to $9 \geq \epsilon \geq 5.5$, from the point of view of preventing knocking and improving engine efficiency.

The system according to the embodiment of this invention can raise the torque of the engine by raising the filling efficiency by supercharging, while ensuring the anti-knocking ability, in the range in which requirement for ensuring reliability and the requirement for prevention of a rapid increase of intake resistance can be satisfied, for example, by making the cylinder bore size, B, smaller so as to become advantageous to the suppression of knocking and further by adjusting the timing of ignition. Further, this system can suppress the temperature of exhaust gases from elevating at the high-speed and high-load time by supplying well cooled EGR gases from the high-load EGR passage 22 at the EGR rate R satisfying the formula (14) above.

Figure 13:
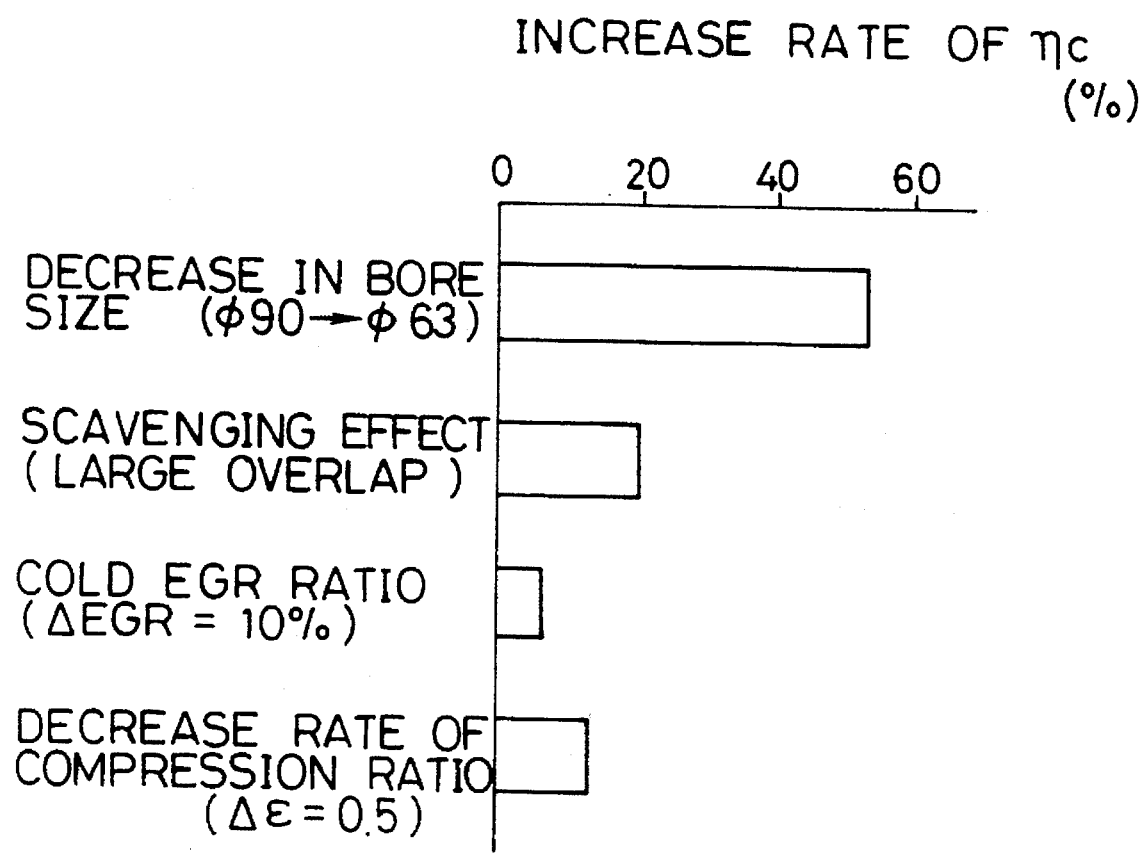
FIG. 13 is a graph showing the effects of various elements upon an increase in filling efficiency.

Further, a description will be made of the action, particularly of suppressing the temperature of exhaust gases from elevating with reference to the data as shown in FIGS. 12 and 13.

FIG. 13 shows data on the portions of the improvements in the filling efficiency (corresponding to the improved portions of the anti-knocking performance), which can be achieved by holding the anti-knocking ability at a constant level. The data was prepared on the basis of experiments. As is apparent from FIG. 13, the filling efficiency can be raised by improving the anti-knocking performance, when the cylinder bore size is made smaller.

FIG. 12 shows experimental data on a decrease in the temperature of exhaust gases. As shown in FIG. 12, when cooled EGR gases are supplied, the temperature of exhaust gases is lowered by 60° C. when the EGR rate R is increased by 10%. This effect is greater than when the air-fuel ratio is made rich.

Further, the temperature of exhaust gases is lowered by 20° C. when the compression ratio ε is elevated by Δε=1. Conversely, the temperature of exhaust gases is elevated by 20° C. when the compression ratio ε is lowered by Δε=1. In addition, in order to lower the temperature of exhaust gases by 20° C., the EGR rate R is required to be increased by 3% (≈20/6). Furthermore, when the compression ratio ε is elevated to 9, the temperature of exhaust gases can be avoided even if the EGR rate R is set to zero (0).

By setting the EGR rate R in accordance with the compression ratio ε so as to satisfy the relations as indicated by the formula (14), the elevation of exhaust gases can effectively be suppressed even if the compression ratio ε would be low. Further, the system according to the present invention does not require to make the air-fuel ratio rich, thereby holding a high degree of fuel economy.

What is claimed is:

1. An internal combustion engine with a supercharger, of a reciprocating piston type, having a supercharger disposed in an intake passage, wherein the relation of a pressure ratio (γ= P/Po) of pressure (P) on the discharge side of the supercharger to atmospheric pressure (Po) at the time of high load with a geometric compression ratio (ε) of the engine and a cylinder bore size (B), represented by millimeter, satisfies the following formula:

$$\gamma \geq -0.29E + 6.0 - 0.022B.$$

2. A supercharged engine as claimed in claim 1, wherein said cylinder bore size is 70 mm or less.

3. A supercharged engine as claimed in claim 2, wherein said cylinder bore size is 50 mm or more.

4. A supercharged engine as claimed in claim 2, wherein a displacement for one cylinder, or a single chamber volume, is 400 cc or less.

5. A supercharged engine as claimed in claim 1, wherein a speed of engine rotation, Na, at which a piston speed Um becomes Um=2.0×10,000 mm per second, is equal to or larger than a speed of engine rotation, Nb, at which a mean intake mach number Mi becomes Mi=0.5.

6. A supercharged engine as claimed in claim 2, wherein a ratio of a piston stroke S to said cylinder bore size B is set to S/B>1.

7. A supercharged engine as claimed in claim 4, wherein a ratio of a piston stroke S to said cylinder bore size B is set to S/B>1.

8. A supercharged engine as claimed in claim 5, wherein a ratio of a piston stroke S to said cylinder bore size B is set to S/B>1.

9. A supercharged engine as claimed in claim 4, wherein a speed of engine rotation, Na, at which a piston speed Um becomes Um=2.0×10,000 mm per second, is set to Na≦8,000 rpm.

10. A supercharged engine as claimed in claim 5, wherein a speed of engine rotation, Na, at which a piston speed Um becomes Um=2.0×10,000 mm per second, is set to Na≦8,000 rpm.

11. A supercharged engine as claimed in claim 1, wherein:
said cylinder bore size B is set to 50 mm≦B≦ 70 mm;
when a speed of engine rotation at which a piston speed Um becomes Um=2.0×10,000 mm per second, is indicated by Na and a speed of engine rotation at which a mean intake mach number Mi becomes Mi=0.5 is indicated by Nb, Na and Nb are set so as to satisfy the following relations: Na≦Nb; Na-Nb≦2,000 rpm; Nb≦5,000 rpm; and Na=8,000 rpm;
a ratio of a piston stroke S to said cylinder bore size B is set to S/B>1; and
a displacement for one cylinder, or a single chamber volume, is set to from 150 cc to 400 cc.

12. A supercharged engine as claimed in claim 1, wherein two or more intake valves are disposed for every one cylinder.

13. A supercharged engine as claimed in claim 12, wherein the number of intake valves disposed for every one cylinder is two.

14. A supercharged engine as claimed in claim 12, wherein the number of exhaust valves disposed for every one cylinder is two.

15. A supercharged engine as claimed in claim 1, wherein:
an overlap period of time in which a period of time during which the intake valve is opened overlaps with a period of time during which an exhaust valve is opened is set to a crank angle of 20° or more.

16. A supercharged engine as claimed in claim 1, wherein:
a timing of closing an intake valve is retarded at a crank angle of 60° or more after BDC.

17. A supercharged engine as claimed in claim 1, further comprising:
an EGR means for recirculating exhaust gases into a combustion chamber in the cylinder at least at the time of high load;
wherein when an EGR rate at which the exhaust gases are recirculated with said EGR means is indicated by Re, represented in %, the following formula is satisfied:

$$\gamma \times (1+Re/100) \geq -0.29 \times \epsilon + 6.0 - 0.022B + 0.007Re/100.$$

18. A supercharged engine as claimed in claim 17, wherein when an octane value of fuel is indicated by Ro, the following formula is satisfied:

$$\gamma \times (1+Re/100) \geq -0.29 \times \epsilon + (0.09+0.059Ro) - 0.022B + 0.007Re/100.$$

19. A supercharged engine as claimed in claim 17, further comprising a cooler means for cooling the exhaust gases for recirculation into the combustion chamber at the time of high load.

20. A supercharged engine as claimed in claim 1, further comprising:
an EGR means for recirculating exhaust gases into a combustion chamber in the cylinder at least at the time of high load;
wherein when an EGR rate at which the exhaust gases are recirculated with said EGR means is indicated by Re represented in %, the following formula is satisfied:

$$Re \geq (9-\epsilon) \times 3.$$

21. A supercharged engine as claimed in claim 20, wherein a geometric compression ratio $\epsilon$ is set to from 5.5 to 9.0.

22. A supercharged engine as claimed in claim 1, further comprising:
a valve timing change-over mechanism for changing a timing of opening and closing the intake valve;
wherein an overlap period of time, in which a period of time during which said intake valve is opened overlaps with a period of time during which an exhaust valve is opened, is changed so as to be set at a crank angle of 20° or greater at the time of high load and so as to become smaller at the time of low load than at the time of high load by said valve timing change-over mechanism; and
wherein the following formula is satisfied:

$$\gamma \geq -0.29\epsilon + 6.2 - 0.022B.$$

23. A supercharged engine as claimed in claim 1, further comprising:
a valve timing change-over mechanism for changing a timing of opening and closing the intake valve;
wherein the timing of closing said intake valve is retarded so as to be set at more than 60° after BDC at the time of high load and so as to become smaller at the time of low load than at the time of high load, by said valve timing change-over mechanism; and
wherein the following formula is satisfied:

$$\gamma \geq -0.29E + 6.2 - 0.022B.$$

24. A supercharged engine as claimed in claim 1, further comprising:
a valve timing change-over mechanism for changing a timing of opening and closing the intake valve;
wherein an overlap period of time, in which a period of time during which said intake valve is opened overlaps with a period of time during which an exhaust valve is opened, is changed so as to be set at a crank angle of 20° or greater at the time of high load and so as to become smaller at the time of low load than at the time of high load, by said valve timing change-over mechanism;
wherein the timing of closing said intake valve is retarded so as to be set at more than 60° after BDC at the time of high load and so as to become smaller at the time of low load than at the time of high load, by said valve timing change-over mechanism; and
wherein the following formula is satisfied:

$$\gamma \geq -0.29E + 6.2 - 0.022B.$$

25. A supercharged internal combustion engine of a reciprocating piston type, having a supercharger disposed in an intake passage, comprising:

an EGR means for recirculating exhaust gases into a combustion chamber in a cylinder of the engine at least at the time of high load;

wherein said cylinder bore size is set to 70 mm or less; and wherein the relation of a geometric compression ratio $\epsilon$ of the engine with an EGR ratio, Re (%), in which exhaust gases are recirculated by said EGR means satisfies the following formula:

$$Re \geq (9-\epsilon) \times 3.$$

26. A supercharged engine as claimed in claim 25, wherein a ratio of a piston stroke S to said cylinder bore size B is set to S/B>1.

27. A supercharged engine as claimed in claim 25, wherein a speed of engine rotation, Na, which gives a piston speed Um=2.0×10,000 mm per second, is set to Na≧8,000 rpm.

28. A supercharged internal combustion engine of a reciprocating piston type, having a supercharger disposed in an intake passage, comprising:

an EGR means for recirculating exhaust gases into a combustion chamber in a cylinder of the engine at least at the time of high load;

wherein a speed of engine rotation, Na, which gives a piston speed Um=2.0×10,000 mm per second, is set to be equal to or larger than a speed of engine rotation, Nb, which reaches a mean intake mach number Mi =0.5; and wherein the relation of a geometric compression ratio $\epsilon$ of the engine with an EGR rate Re, represented by %, of recirculation of the exhaust gases by the EGR means satisfies the following formula:

$$Re \geq (9-\epsilon) \times 3.$$

29. A supercharged engine as claimed in claim 28, wherein a ratio of a piston stroke S to said cylinder bore size B is set to S/B>1.

30. A supercharged engine as claimed in claim 28, wherein said speed of engine rotation Na is set to 8,000 rpm or less.

31. A supercharged internal combustion engine of a reciprocating piston type, having a supercharger disposed in an intake passage, comprising:

an EGR means for recirculating exhaust gases into a combustion chamber in a cylinder of the engine at least at the time of high load;

wherein a displacement of one cylinder, that is, a single chamber volume, is set to be 400 cc or less;

wherein a ratio of a piston stroke S to said cylinder bore size B is set to S/B>1; and wherein the relation of a geometric compression ratio $\epsilon$ of the engine with an EGR rate Re, represented by of recirculation of the exhaust gases by the EGR means satisfies the following formula:

$$Re \geq (9-\epsilon) \times 3.$$

32. An internal combustion engine of a reciprocating piston type with a supercharger, having a supercharger disposed in an intake passage, wherein relations of a pressure ratio $\gamma$ of a pressure (P) on the discharge side of said supercharger at the time of high load to atmospheric pressure (Po), a geometric compression ratio E of the engine, said cylinder bore size B (mm), and an octane value Ro of fuel satisfies the following formula:

$$\gamma \geq 0.29E + 0.09 + 0.059Ro - 0.022B.$$

33. A supercharged engine as claimed in claim 32, further comprising:

an EGR means for recirculating exhaust gases into a combustion chamber in a cylinder of the engine at least at the time of high load;

wherein when an EGR rate at which to recirculate exhaust gases by said EGR means is indicated by Re (%), the following formula is satisfied:

$$\gamma \times (1+Re/100) \geq -0.29 \times \epsilon + (0.09+0.059Ro) - 0.022B + 0.007Re/100.$$

34. A supercharged engine as claimed in claim 27, wherein when a speed of engine rotation at which a piston speed Um becomes Um=2.0×10,000 mm is indicated by Na and a speed of engine rotation at which a mean intake mach number Mi becomes Mi=0.5 is indicated by Nb, Na and Nb are set so as to satisfy the following relations: Na≧Nb; Na−Nb≦2,000 rpm; and Nb≧5,000 rpm.

35. A supercharged engine as claimed in claim 34, wherein:

a displacement for one cylinder, or a single chamber volume, is set to from 150 cc to 400 cc; and a ratio of a piston stroke S to said cylinder bore size B is set to S/B>1.

36. A supercharged engine as claimed in claim 25, wherein a displacement for one cylinder, or a single chamber volume, is set to 400 cc or less.

37. A supercharged engine as claimed in claim 30, wherein Na−Nb≧2,000 rpm and Nb≧5,000 rpm.

38. A supercharged engine as claimed in claim 28, wherein a displacement for one cylinder, or a single chamber volume, is set to 400 cc or less.

39. A supercharged engine as claimed in claim 28, wherein:

a displacement for one cylinder, or a single chamber volume, is set to from 150 cc to 400 cc; and a ratio of a piston stroke S to said cylinder bore size B is set to S/B>1.

40. A supercharged engine as claimed in claim 31, wherein said cylinder bore size is set to 70 mm or less.

41. A supercharged engine as claimed in any of claims 25–40, wherein the number of intake valves disposed for each one cylinder is two or more.

42. A supercharged engine as claimed in claim 41, wherein the number of each of intake valves and exhaust valves disposed for each one cylinder is two.

43. A supercharged engine as claimed in any of claims 25–40, further comprising a cooler means for cooling exhaust gases for recirculation of exhaust gases at the time of high load.

44. A supercharged engine as claimed in claim 43, wherein said cooled exhaust gases for EGR are recirculated into a combustion chamber only at the time of high load and high engine rotation.

45. A supercharged engine as claimed in any of claims 25–40, wherein the timing of closing an intake valve is retarded at a crank angle of 60° or more after BDC at least at the time of high load.

46. A supercharged engine as claimed in any of claims 25–40, wherein an overlap period of time in which a period of time during which the intake valve is opened overlaps with a period of time during which an exhaust valve is opened is set to a crank angle of 20° or more at least at the time of high load.

\* \* \* \* \*